United States Patent
Miller et al.

(10) Patent No.: US 10,861,251 B2
(45) Date of Patent: Dec. 8, 2020

(54) VEHICLE MAINTENANCE OPERATION

(71) Applicant: Ford Global Technologies, LLC, Dearborn, MI (US)

(72) Inventors: Kenneth J. Miller, Canton, MI (US); Aed M. Dudar, Canton, MI (US); Thomas G. Leone, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 231 days.

(21) Appl. No.: 15/837,506

(22) Filed: Dec. 11, 2017

(65) Prior Publication Data

US 2019/0180521 A1    Jun. 13, 2019

(51) Int. Cl.
| | | |
|---|---|---|
| *G07C 5/00* | (2006.01) | |
| *G07C 5/08* | (2006.01) | |
| *B60W 50/02* | (2012.01) | |
| *B60W 10/20* | (2006.01) | |
| *B60W 10/22* | (2006.01) | |
| *B60Q 1/50* | (2006.01) | |
| *B60W 10/18* | (2012.01) | |

(52) U.S. Cl.
CPC .............. *G07C 5/006* (2013.01); *B60Q 1/50* (2013.01); *B60W 10/18* (2013.01); *B60W 10/20* (2013.01); *B60W 10/22* (2013.01); *B60W 50/0205* (2013.01); *G07C 5/0816* (2013.01); *B60W 2050/022* (2013.01); *G07C 5/008* (2013.01)

(58) Field of Classification Search
CPC ......... B60Q 1/50; B60W 10/18; B60W 10/20; B60W 10/22; B60W 2050/022; B60W 50/0205; B60W 2540/00; B60W 50/02; B60W 50/0225; B60W 50/035; F02D 2041/223; F02D 2041/228; F02D 2200/0602; F02D 41/123; F02D 41/222; B60R 25/2045
See application file for complete search history.

(56) References Cited

U.S. PATENT DOCUMENTS

| | | | |
|---|---|---|---|
| 4,827,520 A | 5/1989 | Zeinstra | |
| 6,032,644 A * | 3/2000 | Bederna | F02D 41/182 123/339.15 |
| 6,085,428 A | 7/2000 | Casby et al. | |
| 6,496,107 B1 | 12/2002 | Himmelstein | |
| 6,958,611 B1 | 10/2005 | Kramer | |
| 8,077,022 B2 | 12/2011 | Baruco et al. | |
| 8,996,235 B2 | 3/2015 | Singh et al. | |
| 9,349,365 B2 | 5/2016 | Rajagopal et al. | |
| 2012/0158238 A1 * | 6/2012 | Daley | G07C 5/00 701/29.1 |

(Continued)

FOREIGN PATENT DOCUMENTS

| | | | | |
|---|---|---|---|---|
| CN | 106601244 A | | 4/2017 | |
| DE | 10 2014 211 543 A1 * | | 10/2013 | ......... B60R 25/2045 |
| WO | WO-9951450 A1 * | | 10/1999 | ............. B62D 21/12 |

*Primary Examiner* — Redhwan K Mawari
(74) *Attorney, Agent, or Firm* — Frank A. MacKenzie; Bejin Bieneman PLC

(57) ABSTRACT

A system includes a processor and a memory. The memory stores instructions executable by the processor to identify a vehicle fault condition, select a vehicle component according to a location of the fault condition in the vehicle and a detected location of a user outside of the vehicle, and actuate the vehicle component.

20 Claims, 2 Drawing Sheets

(56) References Cited

U.S. PATENT DOCUMENTS

2015/0159574 A1* 6/2015 Stack ................... F02D 41/123
                                                              701/104
2015/0159615 A1* 6/2015 Van Wiemeersch .........................
                                                            F02N 11/0807
                                                              701/113
2019/0180521 A1* 6/2019 Miller ............... B60W 50/0225

* cited by examiner

VEHICLE MAINTENANCE OPERATION

BACKGROUND

In an autonomous vehicle, typically one or more controllers (i.e., computers) control vehicle operations by actuating vehicle components based on data received, e.g., from other vehicle components, such as sensors. However, a vehicle component such as an actuator, sensor, controller, etc., may fail to operate. Unfortunately, vehicles lack ways to effectively and/or efficiently identify a failed component and/or repair the failed component(s).

DETAILED DESCRIPTION

Introduction

Figure 1:
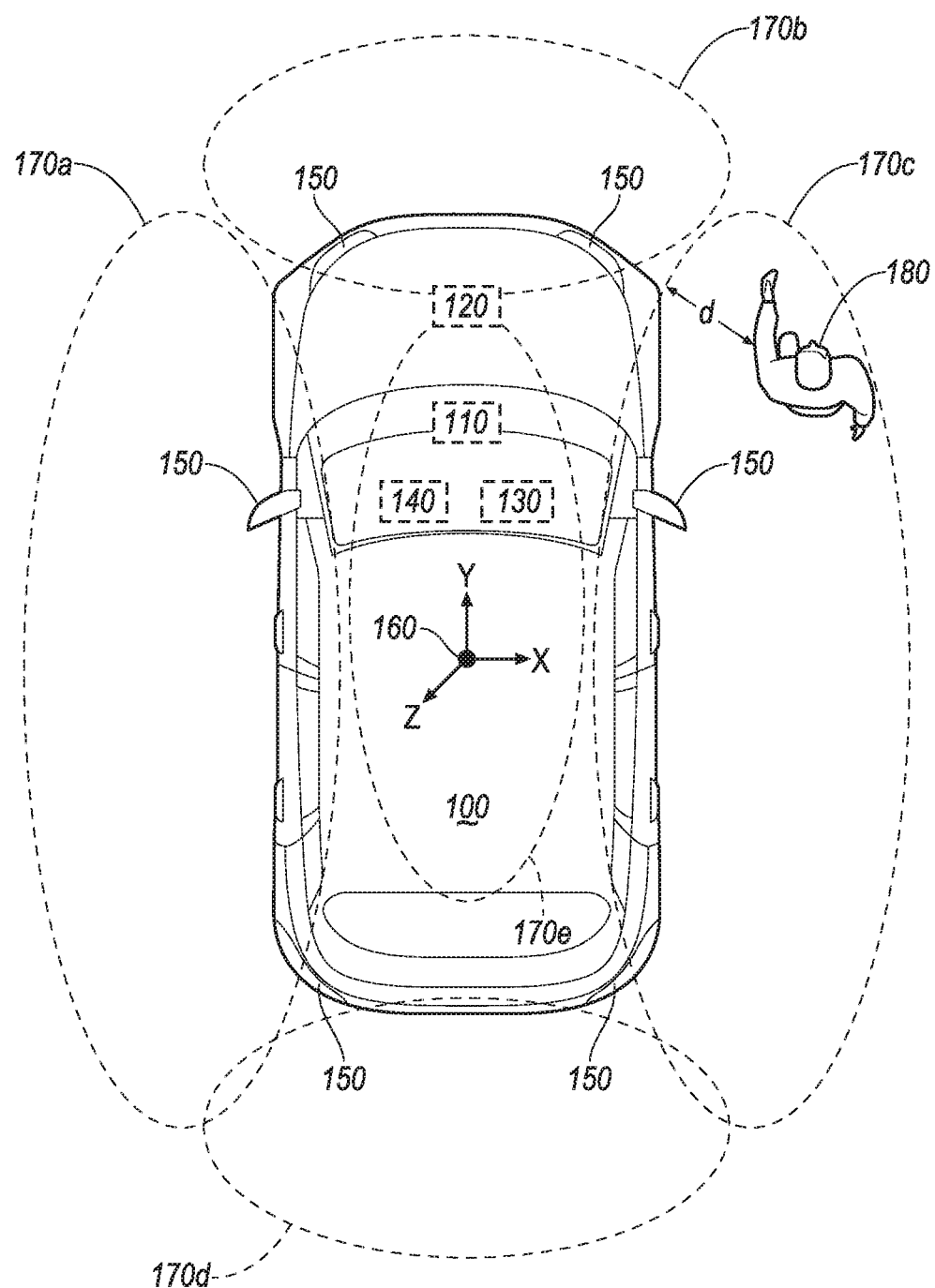
FIG. 1 is a diagram of an exemplary vehicle system.

Disclosed herein is a system including a processor and a memory. The memory stores instructions executable by the processor to identify a vehicle fault condition, to select a vehicle component according to a location of the fault condition in the vehicle and a detected location of a user outside of the vehicle, and to actuate the vehicle component.

The instructions may further include instructions to actuate the selected vehicle component upon determining that a distance of the detected user location to the vehicle component is less than a predetermined threshold.

The vehicle fault condition may be a fault condition in a second vehicle component.

The instructions may further include instructions to detect the location of the user based on image data.

The selected vehicle component may include at least one of a vehicle exterior light, a brake actuator, a steering actuator, and a suspension actuator.

The instructions may further include instructions to determine a maintenance state of the vehicle component based on the detected location of the user, and to actuate the vehicle component to the maintenance state.

The maintenance state may be one of a plurality of vehicle component positions relative to a vehicle body.

The maintenance state may be one of an on and an off state of the selected vehicle component.

The instructions may further include instructions to actuate at least one of vehicle exterior light, a brake actuator, a steering actuator, and a suspension actuator based on the detected location of the user.

The instructions may further include instructions to actuate the vehicle component further based on a detected user gesture.

Further disclosed herein is a method including identifying a vehicle fault condition, selecting a vehicle component according to a location of the fault condition in the vehicle and a detected location of a user outside of the vehicle, and actuating the vehicle component.

The method may further include actuating the selected vehicle component upon determining that a distance of the detected user location to the vehicle component is less than a predetermined threshold.

The vehicle fault condition may be a fault condition in a second vehicle component.

The method may further include detecting the location of the user based on image data.

The selected vehicle component may include at least one of a vehicle exterior light, a brake actuator, a steering actuator, and a suspension actuator.

The method may further include determining a maintenance state of the vehicle component based on the detected location of the user, and actuating the vehicle component to the maintenance state.

The maintenance state may be one of a plurality of vehicle component positions relative to a vehicle body.

The maintenance state may be one of an on and an off state of the selected vehicle component.

The method of may further include actuating at least one of vehicle exterior light, a brake actuator, a steering actuator, and a suspension actuator based on the detected location of the user.

The method may further include actuating the vehicle component further based on a detected user gesture.

Further disclosed is a computing device programmed to execute any of the above method steps. Yet further disclosed is a vehicle comprising the computing device.

Yet further disclosed is a computer program product, comprising a computer readable medium storing instructions executable by a computer processor, to execute any of the above method steps.

System Elements

FIG. 1 is a block diagram of a vehicle 100. The vehicle 100 may be powered in variety of known ways, e.g., with an electric motor and/or internal combustion engine. The vehicle 100 may include a computer 110, actuator(s) 120, sensor(s) 130, a human machine interface (HMI 140), a human machine interface (HMI 140), and exterior lights 150, each of which are discussed in more detail below. The vehicle 100 includes a reference point 160 (sometimes for convenience referred to as a "center" point) that may be specified in one of a variety of ways, e.g., at a center of gravity of the vehicle 100, at an intersection of a vehicle 100 longitudinal and lateral axes, etc.

The computer 110 includes a processor and a memory. The memory includes one or more forms of computer-readable media, and stores instructions executable by the computer 110 for performing various operations, including as disclosed herein.

The computer 110 may include programming to operate one or more of vehicle brakes, propulsion (i.e., means for overcoming resistance and propelling the vehicle 100, such as one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may operate the vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking; in a non-autonomous mode a human operator controls each of vehicle 100 propulsion, braking, and steering.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices included in or associated with components in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote computer via a wireless communication network. The communication network may be one or more of wireless communication mechanisms, including any of wireless communication mechanisms, including any desired combination of wireless, e.g., cellular, wireless, satellite, microwave and radio frequency, communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

Sensors 130 may include a variety of devices to provide data via the vehicle communications bus. For example, the sensors 130 may include one or more cameras, radars, and/or Light Detection and Ranging (LIDAR) sensors disposed in the vehicle 100 providing data encompassing at least some of the vehicle interior and/or exterior.

The actuators 120 can actuate various vehicle subsystems in accordance with appropriate control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a control unit located in the vehicle 100, e.g., an electronic control unit (ECU) such as a brake controller, etc. The vehicle 100 may include various components or sub-systems, each including one or more sensors 130, actuators 120, controller, etc. For example, the vehicle 100 may include a brake component including brake sensors 130, brake actuators 120, and/or other electronic, mechanical, etc. elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such as a touchscreen display, a smart phone, etc., for receiving information from a user and/or output information to the user.

A vehicle 100 component, e.g., an actuator 120, a sensor 130, an electronic controller included in a component, etc., may have a fault. A fault (or fault condition) is a condition in which a component fails to operate or operates outside of one or more predefined parameters (e.g., a predefined parameter could be a physical quantity such as temperature, torque, revolutions per minute, pressure, etc.). The vehicle 100 computer 110 may be programmed to determine whether a vehicle 100 component, e.g., a propulsion, braking, steering, etc., is in a fault condition based on data received from, e.g., various vehicle 100 sensors 130, actuators 120, controllers, etc. For example, a fault condition can be determined by a diagnostic operation such as an onboard diagnostic operation (OBD), i.e., the computer 110 may be programmed to monitor a vehicle 100 component, possibly while actuating the component in a specified way for the diagnostic operation, and determine whether a fault condition has occurred, e.g., whether a physical quantity is outside a predefined range.

In addition to detecting fault condition(s) in the vehicle 100, a diagnostic operation may include estimating a remaining useful life of a vehicle 100 part, e.g., a brake pad, tire, windshield wiper blade, etc., and/or a vehicle 100 fluid such as engine oil, brake fluid, etc. The remaining useful life may be specified in units of time, e.g., 1 month, distance traveled, e.g., 500 kilometer (km), and/or a combination thereof, e.g., the earlier of 1 month and 50 km. The computer 110 may be programmed to estimate the remaining useful life of a vehicle 100 part based on data received from a vehicle 100 sensor 130, e.g., an odometer sensor 130, a timer providing a current time and date, and stored data such as an expected useful life of one or more vehicle 100 parts and records of last replacement of each of the vehicle 100 parts. For example, the computer 110 memory could store a table or tables correlating various metrics, e.g., time of last oil change, miles since last brake pad change, etc., with respective values (e.g., time and/or distance) for remaining useful life of a respective part, e.g., brake pads have 500 miles of remaining useful life.

Records, i.e., a history of a most recent replacement of a vehicle 100 part, may include an associated odometer reading and/or a date of replacement of the part. Additionally or alternatively, the computer 110 may be programmed to estimate the remaining useful life of a vehicle 100 part based at least in part on data received from a vehicle 100 sensor 130. For example, the computer 110 may be programmed to estimate the remaining useful life of the vehicle 100 engine oil based on historical data including engine temperature, engine speed, duration and intensity of brake pedal actuation, duration of windshield wiper usage, etc., and/or distance traveled since the last oil change of the vehicle 100.

In one example, the computer 110 may be programmed to estimate the remaining useful life of a part, e.g., the vehicle 100 engine oil, by subtracting the distance traveled since the last oil change from a predetermined useful life of the engine oil. The useful life of the engine oil may be predetermined by an oil manufacturer, a vehicle 100 manufacturer, etc. For example, the computer 110 may estimate a remaining useful life of 1000 km when the predetermined useful life of the engine oil is 6000 km and the vehicle 100 has traveled 5000 km since the last oil change. Additionally or alternatively, the computer 110 may be programmed to estimate the remaining useful life of the engine oil by subtracting an age parameter (e.g., determined based on the temperature, speed, etc.) from the predetermined useful life of the engine oil. The age parameter may be determined in units of kilometer (km) based on, e.g., a mathematical operation including integral operation on the engine temperature and/or vehicle 100 speed since the last oil change. In other words, operating the engine in higher temperature and/or operating the vehicle 100 in higher speeds may proportionally increase the age parameter (i.e., decrease the remaining useful life).

A remaining useful life of a vehicle 100 component less than a predetermined threshold may indicate an increased likelihood of a fault condition in the vehicle 100 component, e.g., a flat tire, partially operational or non-operational brake pad or windshield wiper, etc. Further, a remaining useful life less than a predetermined threshold can be a "predicted" fault condition. In the present disclosure, a "diagnostic status" specifies whether the diagnostic operation determines that the fault condition is detected, e.g., an "active" and an "inactive" fault condition. Further, the diagnostic status may include data including a remaining useful life of one or more vehicle 100 components.

A fault condition in the vehicle 100, e.g., of a component or part needed to safely operate the vehicle 100, may impair and/or prevent vehicle 100 operation, e.g., preventing it 170e, as shown in FIG. 1. Areas around the vehicle 100 can include a left area 170a, a front area 170b, a right area 170c, a rear area 170d, and an underneath area 170e (e.g., when the vehicle 100 is elevated by a hoist and the user 180 is under the vehicle 100). The areas may have any shape such as an elliptical, rectangular, circular, non-geometric, etc., shape. Additionally or alternatively, the location of the user 180 may be specified based on the three-dimensional Cartesian coordinate system with the origin at the vehicle 100 reference point 160. The computer 110 may be programmed to detect the location of the user 180 based on image data, e.g., received from a vehicle 100 camera sensor 130, a LIDAR sensor 130, etc., and determine a distance d of the user 180 to a vehicle 100 component and/or the vehicle 100 reference point 160.

TABLE 1

| Fault Condition | Location of user | Failed vehicle component | Actuated vehicle component |
|---|---|---|---|
| Front right tire low pressure | 170b | Front right tire | Front light exterior light |
| Front right tire low pressure | 170c | Front right tire | Front right exterior light and right side exterior light |
| License plate light short circuit | 170a, 170c, 170d | License plate light bulb and/or license plate light wiring | Brake lights and/or rear indicator exterior lights |
| Front right suspension actuator mechanical failure | 170b, 170c, 170d, | Front right active suspension actuator | Front right exterior lights and front right active suspension actuator |
| Front right suspension actuator mechanical failure | 170e | Front right active suspension actuator | Front right active suspension actuator | from navigating to a destination. As discussed above, the computer 110 may be programmed to perform a diagnostic operation to detect a fault condition in the vehicle 100. Advantageously, the vehicle 100 computer 110 can be programmed to identify a vehicle fault condition, select a vehicle 100 component according to a location of the fault in the vehicle 100 and a detected location of a user 180 outside of the vehicle, and actuate the vehicle 100 component.

In the context of this disclosure, a vehicle maintenance operation includes identifying a failed component and/or repairing the failed component. Repairing a failed component may further include a replacement of the component. The vehicle 100 maintenance operation may be performed in, e.g., a service center. As discussed below with reference to Tables 1-2, the present disclosure provides a solution to make the maintenance operation of the vehicle 100 more efficient and/or effective.

The "location of a fault" is a location on and/or in the vehicle 100 of one or more components of the vehicle 100 that cause the identified fault condition. The "location" may be specified based on a three-dimensional Cartesian location coordinate system with an origin at the vehicle 100 reference point 160. Additionally or alternatively, the location of the fault may include the location(s) of the vehicle 100 component(s) identified for replacement because a determined rest of useful life of the respective components is less than a predetermined threshold, e.g., 100 km and/or 1 month.

The location of the user 180 outside the vehicle 100 is typically specified in terms of a user 180 location relative to the vehicle 100. In one example, the location of the user 180 may be specified based on, e.g., areas 170a, 170, 170c, 170d, As discussed above, the computer 110 can be programmed to select a vehicle 100 component according to a location of the fault condition in the vehicle 100 and a detected location of a user 180 outside of the vehicle. Table 1 shows example fault conditions, user 180 locations, and selected vehicle 100 component to actuate. The computer 110 may be programmed to select the component by looking up a respective component and action in Table 1 based on the fault condition and the user 180 location entries in Table 1. The selected vehicle 100 component(s) may include a vehicle 100 exterior light 150, a brake actuator 120, a steering actuator 120, a suspension actuator 120, etc. The computer 110 may be programmed to actuate the vehicle exterior light 150, the brake actuator 120, etc., based on the detected location of the user 180.

As shown in Table 1, an example vehicle 100 fault condition may be identified in the component that is selected to be actuated, e.g., the front right suspension actuator 120, and/or in a second component such as the exterior lights 150, i.e., a vehicle 100 component that has no fault condition can be selected for actuating to indicate (or guide to) the location of the vehicle 100 component where the fault condition is located. For example, the computer 110 may be programmed to select and to actuate a front right exterior light 150 based on identifying a front right tire low pressure fault condition and user 180 location at the area 170b.

As discussed above, the location of the user 180 may be specified based on a Cartesian coordinate system (e.g., three-dimensional location coordinates). The computer 110 may be programmed to actuate the selected vehicle 100 component upon determining that the distance d of the detected user 180 location to the vehicle component, e.g., a front wheel, is less than a predetermined threshold, e.g., 1 meter (m).

TABLE 2

| Maintenance Operation | Location of user | Gesture | Actuated vehicle component |
| --- | --- | --- | --- |
| Engine Test | 170b | User hand motion upward | Incrementally increase engine speed |
| Engine Test | 170b | User hand motion downward | Incrementally decrease engine speed |
| Unscrewing tire bolts while vehicle is off the ground surface | 170a | User placed wrench on front left tire bolts | Activate brake actuator |
| Suspension actuator replacement | 170e | Hand/finger motion to a suspension actuator | Actuate the suspension actuator to move to a maintenance position |

As discussed above, a maintenance operation may include repairing and/or replacing a vehicle 100 component, e.g., replacing engine oil, replacing a wheel with a flat tire, replacing a faulty suspension actuator 120, changing engine oil, etc. Typically, a maintenance operation may include providing input to the vehicle 100 HMI 140, e.g., a gas pedal, brake pedal, etc. In some examples, the inputs to the vehicle 100 HMI 140 may be applied based on a specific time and/or condition. Table 2 shows example maintenance operations of the vehicle 100. In one example, the vehicle 100 actuator 120 may be actuated to prevent a rotation of the vehicle 100 wheel when the user 180 intends to unscrew bolt(s) of the vehicle 100 wheel. Advantageously, the computer 110 may be programmed to actuate the vehicle 100 component further based on a detected user 180 gesture, e.g., holding a wrench in hand while sitting next to a vehicle 100 wheel.

A user 180 gesture includes a body posture, a facial expression, a hand/finger motion, a vocal command, etc. For example, a gesture may include a posture such as sitting, bending down, dump up, dumb down, etc., and/or a leap motion such as moving a hand palm upward/downward. For example, a user 180 may look at the vehicle 100 camera sensor 130 and move user's palm upward/downward to indicate an increase/decrease, e.g., of an engine speed as shown in Table 2. The computer 110 may be programmed to determine a user 180 gesture based on data received from a vehicle 100 sensor(s) 130, e.g., a camera sensor 130, an audio sensor 130, an ultrasonic sensor 130, etc.

A maintenance operation may require a placement of the vehicle 100 component in a maintenance state as a part of preparation for repair/replacement and/or as an intermediate action during the repair/replacement.

A maintenance state, in the present context, may include a mechanical position of the component. For example, a maintenance state may be a vehicle 100 component positions relative to a vehicle 100 body. For example, the suspension actuator 120 may have an extended position (a head of the actuator 120 extended away from an actuator 120 body) and a retracted position (a head of the actuator 120 retracted within the actuator 120 body). In one example, the suspension actuator 120 in the extended position may ease an access to the bolt of the actuator 120 to unscrew. Thus, the extended position of the suspension actuator 120 may be specified as the maintenance state of the suspension actuator 120. Additionally or alternatively, a maintenance state may include an electrical state of a vehicle 100 component. For example, the maintenance state may be an on and/or an off state of the selected vehicle 100 component. For example, a blower motor may be turned off prior to unmounting the motor.

Advantageously, the computer 110 may be programmed to determine a maintenance state of the vehicle component based on the detected location of the user 180, and to actuate the vehicle 100 component to the maintenance state, e.g., actuating the suspension actuator 120 to move to a maintenance position based on a user 180 leap motion to ease access to mechanical attachment such as bolts of the vehicle 100 component for unscrewing, etc. For example, while the user 180 is in the underneath area 170e, the computer 110 may actuate a vehicle 100 component to move to a requested state based on an input from the user 180 including the requested state of the component. Such instruction may include a gesture and/or a vocal command.

Processing

Figure 2:
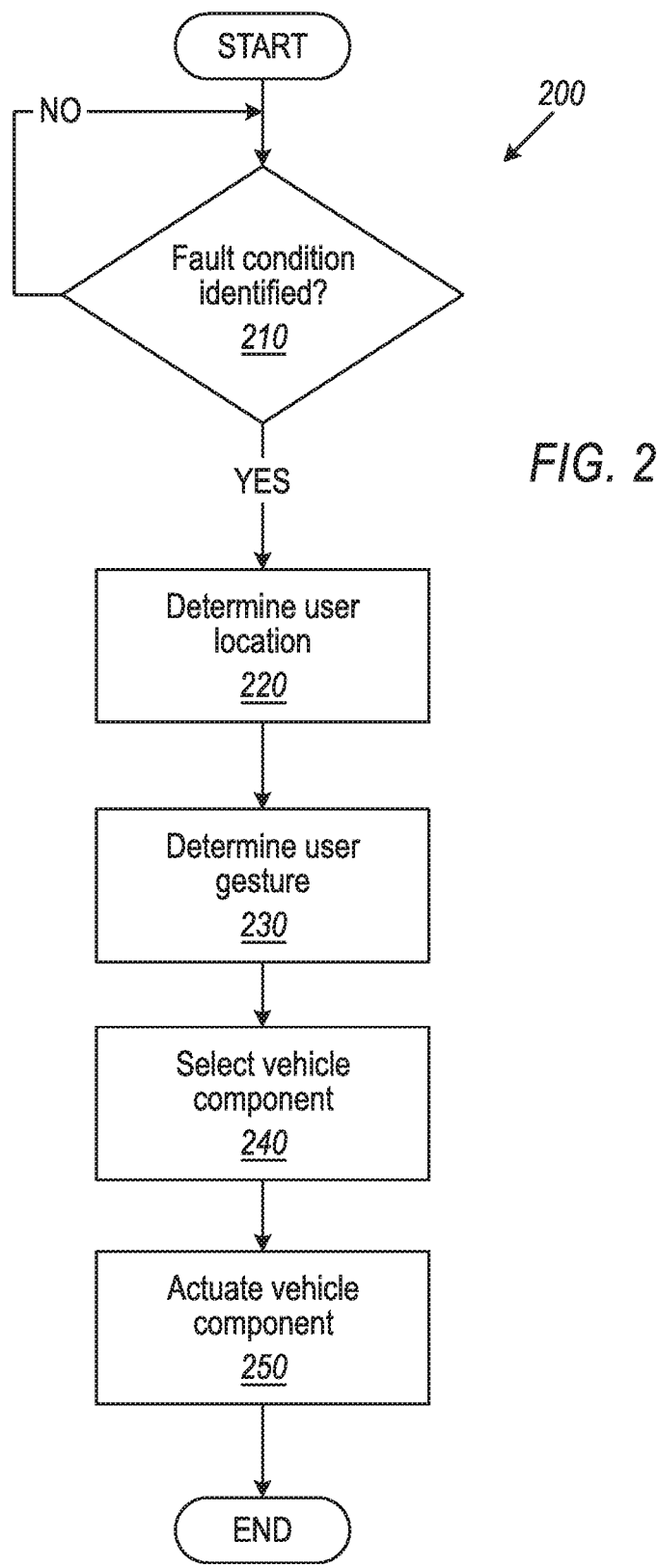
FIG. 2 is a flowchart of an exemplary process for controlling vehicle maintenance operation.

FIG. 2 is a flowchart of an exemplary process 200 for controlling vehicle maintenance operation. The vehicle 100 computer 110 may be programmed to execute blocks of the process 200.

The process 200 begins in a decision block 210, in which the computer 110 determines whether a fault condition is identified in the vehicle 100. For example, the computer 110 may be programmed to monitor a vehicle 100 component, and to determine whether a fault condition has occurred, e.g., whether a physical quantity is outside a predefined range. Additionally or alternatively, the computer 110 may be programmed to identify a maintenance operation, e.g., when a remaining useful life of a vehicle 100 part, e.g., a brake pad, tire, windshield wiper blade, etc., and/or a vehicle 100 fluid such as engine oil, brake fluid, etc., is less than a predetermined threshold, e.g., 100 km and/or 1 month, etc. If the computer 110 determines that a fault condition is identified, then the process 200 proceeds to a block 220; otherwise the process 200 returns to the decision block 210.

In the block 220, the computer 110 determines a user 180 location. For example, the computer 110 may be programmed to determine the user 180 location based on data received from one or more vehicle 100 sensor 130 such as a LIDAR, radar, camera sensor 130. In one example, the computer 110 may be programmed to determine three-dimensional location coordinates of the user 180 relative to the vehicle 100 reference point 160. In another example, the computer 110 may be programmed to determine the user 180 location based on zones specified around the vehicle 100 such as the zones 170a, 170b, 170c, 170d, 170e.

Next, in a block 230, the computer 110 determines a user 180 gesture. For example, the computer 110 may be programmed to determine the user 180 gesture such as a facial expression, hand/finger motion, posture, etc., based on data received from a vehicle 100 sensor 130 such as a camera sensor 130.

Next, in a block 240, the computer 110 selects a vehicle 100 component. The computer 110 may be programmed to select a vehicle 100 component based on the determined location of the fault condition, the determined user 180 location, and/or the determined user 180 gesture, as shown in Tables 1-2.

Next, in a block 250, the computer 110 actuates the selected vehicle 100 component. For example, the computer 110 may be programmed to actuate a vehicle exterior light 150, a brake actuator 120, a steering actuator 120, and/or a suspension actuator 120 based on the detected location of the user 180. Additionally or alternatively, the computer 110 may be programmed to actuate the selected vehicle 100 component to a maintenance state.

Following the block 250, the process 200 ends, or alternatively, returns to the decision block 210, although not shown in FIG. 2.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   identify a vehicle fault condition;
   select a vehicle component for actuation according to a first location of the fault condition in the vehicle, a second location of the vehicle component in the vehicle, and a third detected location at which a user is detected outside of the vehicle; and
   actuate the vehicle component that was selected based on the first, second, and third locations.

2. The system of claim 1, wherein the instructions further include instructions to actuate the selected vehicle component upon determining that a distance of the detected user location to the vehicle component is less than a predetermined threshold.

3. The system of claim 1, wherein the vehicle fault condition is associated with a second vehicle component.

4. The system of claim 1, wherein the instructions further include instructions to detect the location of the user based on image data.

5. The system of claim 1, wherein the selected vehicle component includes at least one of a vehicle exterior light, a brake actuator, a steering actuator, and a suspension actuator.

6. The system of claim 1, wherein the instructions further include instructions to determine a maintenance state of the vehicle component based on the detected location of the user, and to actuate the vehicle component to the maintenance state.

7. The system of claim 6, wherein the maintenance state is one of a plurality of vehicle component positions relative to a vehicle body.

8. The system of claim 6, wherein the maintenance state is one of an on and an off state of the selected vehicle component.

9. The system of claim 1, wherein the instructions further include instructions to actuate at least one of a vehicle exterior light, a brake actuator, a steering actuator, and a suspension actuator based on the detected location of the user.

10. The system of claim 1, wherein the instructions further include instructions to actuate the vehicle component further based on a detected user gesture.

11. A method, comprising:
    identifying a vehicle fault condition;
    selecting a vehicle component for actuation according to a first location of the fault condition in the vehicle, a second location of the vehicle component in the vehicle, and a third detected location at which a user is detected outside of the vehicle; and
    actuating the vehicle component that was selected based on the first, second, and third locations.

12. The method of claim 11, further comprising actuating the selected vehicle component upon determining that a distance of the detected user location to the vehicle component is less than a predetermined threshold.

13. The method of claim 11, wherein the vehicle fault condition is associated with a second vehicle component.

14. The method of claim 11 further comprising detecting the location of the user based on image data.

15. The method of claim 11, wherein the selected vehicle component includes at least one of a vehicle exterior light, a brake actuator, a steering actuator, and a suspension actuator.

16. The method of claim 11, further comprising determining a maintenance state of the vehicle component based on the detected location of the user, and actuating the vehicle component to the maintenance state.

17. The method of claim 16, wherein the maintenance state is one of a plurality of vehicle component positions relative to a vehicle body.

18. The method of claim 16, wherein the maintenance state is one of an on and an off state of the selected vehicle component.

19. The method of claim 11, further comprising actuating at least one of a vehicle exterior light, a brake actuator, a steering actuator, and a suspension actuator based on the detected location of the user.

20. The method of claim 11, further comprising actuating the vehicle component further based on a detected user gesture.

* * * * *